US009322073B1

(12) United States Patent
Herwig

(10) Patent No.: US 9,322,073 B1
(45) Date of Patent: Apr. 26, 2016

(54) PREPARATION OF FLUX LIME FOR A BOF CONVERTER INCLUDING CONVERSION OF TROUBLESOME FINES TO HIGH QUALITY FLUIDIZED LIME

(71) Applicant: ALMAMET USA, Inc., New Castle, PA (US)

(72) Inventor: Frank Herwig, Groditz (DE)

(73) Assignee: Almamet USA, Inc., New Castle, PA (US)

( * ) Notice: Subject to any disclaimer, the term of this patent is extended or adjusted under 35 U.S.C. 154(b) by 124 days.

(21) Appl. No.: 14/200,688

(22) Filed: Mar. 7, 2014

Related U.S. Application Data

(60) Provisional application No. 61/781,325, filed on Mar. 14, 2013.

(51) Int. Cl.
| C21C 7/064 | (2006.01) |
| C21C 7/076 | (2006.01) |
| C04B 2/02 | (2006.01) |
| B02C 23/08 | (2006.01) |
| B07B 1/28 | (2006.01) |
| C21C 7/00 | (2006.01) |

(52) U.S. Cl.
CPC .............. *C21C 7/064* (2013.01); *B02C 23/08* (2013.01); *B07B 1/28* (2013.01); *C04B 2/02* (2013.01); *C21C 7/0037* (2013.01); *C21C 7/0645* (2013.01); *C21C 7/076* (2013.01)

(58) Field of Classification Search
CPC ........ C21C 7/0037; C21C 7/076; C04B 2/02; B02C 23/08; B07C 1/28
See application file for complete search history.

(56) References Cited

U.S. PATENT DOCUMENTS

| 2,906,616 | A | | 9/1959 | Allard et al. |
| 2,912,319 | A | | 11/1959 | Moklebust |
| 3,857,698 | A | * | 12/1974 | Gilpin ..................... C21C 5/36 148/26 |
| 4,007,034 | A | | 2/1977 | Hartwig et al. |
| 4,139,369 | A | | 2/1979 | Kandler et al. |
| 4,142,887 | A | | 3/1979 | Luyckx |
| 4,279,643 | A | | 7/1981 | Jackman |
| 4,316,741 | A | | 2/1982 | Wetzel |
| 4,374,664 | A | | 2/1983 | Mitsuo et al. |
| 4,392,887 | A | | 7/1983 | Goedert |

(Continued)

FOREIGN PATENT DOCUMENTS

KR 2001064776 * 7/2001

OTHER PUBLICATIONS

Herwig, Frank, "Treatment of converter lime—undersize for the pig iron desulphurization", Sep. 9, 2008 (Distributed at Almamet Symposium in Lisbon, Portugal).

*Primary Examiner* — George Wyszomierski
*Assistant Examiner* — Tima M McGuthry Banks
(74) *Attorney, Agent, or Firm* — Beck & Thomas, P.C.

(57) ABSTRACT

Crushed flux lime to be used in a BOF converter is processed to minimize waste dust, obviate environmental complications caused by high pH in waste water, and to utilize a very high percentage of the original crushed lime for useful products. The crushed flux lime is screened to provide a fine grain fraction and a modified flux lime fraction. Only a small percentage of the modified flux lime fraction is dust which may be removed in a dust collection system, and the modified flux lime fraction is then passed to the BOF converter. The fine grain fraction is made into a highly fluidized lime of very small dimensions by pulverizing it further in the presence of a fluidizing agent.

20 Claims, 2 Drawing Sheets

PROCESS BLOCK DIAGRAM

(56) References Cited

U.S. PATENT DOCUMENTS

| | | |
|---|---|---|
| 4,420,333 A | 12/1983 | Takahashi et al. |
| 4,422,873 A | 12/1983 | Yamada et al. |
| 4,444,656 A * | 4/1984 | Nelson .................. B07B 1/28 209/347 |
| 4,528,031 A | 7/1985 | Hacetoglu et al. |
| 4,561,894 A | 12/1985 | Fontaine et al. |
| 4,586,955 A | 5/1986 | Hammer et al. |
| 4,705,561 A | 11/1987 | Green |
| 4,714,202 A * | 12/1987 | Shulof .................... B02C 25/00 241/30 |
| 4,738,715 A | 4/1988 | Muller |
| 4,814,005 A | 3/1989 | Thompson |
| 5,228,902 A | 7/1993 | Bogan et al. |
| 5,972,072 A | 10/1999 | Kinsman et al. |
| 6,391,266 B1 | 5/2002 | Lavely, Jr. |
| 2007/0193412 A1 * | 8/2007 | Manning .................... C21C 7/04 75/565 |
| 2009/0013827 A1 * | 1/2009 | Wolfe .................... C21C 7/0037 75/433 |

* cited by examiner

Fig. 1 PROCESS BLOCK DIAGRAM

PREPARATION OF FLUX LIME FOR A BOF CONVERTER INCLUDING CONVERSION OF TROUBLESOME FINES TO HIGH QUALITY FLUIDIZED LIME

CROSS-REFERENCE TO RELATED APPLICATIONS

This application claims the benefit of U.S. Provisional Application No. 61/781,325, filed Mar. 14, 2013 which is hereby incorporated by reference in its entirety.

TECHNICAL FIELD

Excessive lime fines conventionally cause serious stack losses, overloads, and related problems in dust collectors and other environmental treatment systems associated with the feeding of crushed burnt lime to the BOF converter in steel making facilities. The invention separates the fines in a screening step and captures them for conversion by a treating and grinding system into products useful not only in the steel making process but in other industrial processes.

BACKGROUND OF THE INVENTION

The basic oxygen steelmaking process is as follows. Molten pig iron (referred to as "hot metal") from a blast furnace is poured into a large refractory-lined container called a ladle. The metal in the ladle is either sent directly for basic oxygen steelmaking or diverted first to a pretreatment stage. Pretreatment of the blast furnace hot metal is used to reduce the content of sulfur, silicon, and phosphorus. In the desulfurizing pretreatment, a lance, sometimes called a dip lance, is lowered into the molten iron in the ladle and several hundred kilograms of powdered magnesium (or sometimes other materials, such as lime, calcium carbide or combinations thereof which can be added separately through different lances) are added by pneumatic injection, preferably with an inert gas. Sulfur impurities are reduced to magnesium sulfide in a violent exothermic reaction. The magnesium sulfide is then raked off. Similar pretreatment is possible for desiliconization and dephosphorization using mill scale (iron oxide) and lime as reagents. The decision to pretreat depends on the quality of the blast furnace hot metal and the required final quality of the basic oxygen furnace ("BOF") steel.

Filling the furnace with the ingredients is called charging. The BOF process is autogenous, the required thermal energy is produced during the process. Maintaining the proper charge balance, the ratio of hot metal to scrap, is therefore very important. The BOF vessel may be one-fifth filled with steel scrap. Molten iron from the ladle, whether or not treated as described above, is added as required by the charge balance. A typical chemistry of hot metal charged into the BOF vessel is: 4% C, 0.2-0.8% Si, 0.08%-0.18% P, and 0.01-0.04%, or, more narrowly, 0.002-0.005% S.

The BOF vessel is then set upright and a water-cooled lance is lowered down into it. The lance blows 99% pure oxygen onto the steel and iron, igniting the carbon dissolved in the steel and burning it to form carbon monoxide and carbon dioxide, causing the temperature to rise to about 1700° C. This melts the scrap, lowers the carbon content of the molten iron and helps remove unwanted chemical elements. It is this use of oxygen instead of air that improves upon the now discontinued Bessemer Process, as the nitrogen (and other gases) in air do not react with the charge as oxygen does. High purity oxygen is blown into the furnace or BOF vessel through a vertically oriented water-cooled lance with velocities faster than Mach 1.

Details and parameters of the above description may vary; it is intended to provide the reader with a typical background for the invention.

Fluxes (burnt lime or dolomite) are fed into the BOF vessel to form slag, which absorbs impurities of the steelmaking process. A prior art process fed a crushed burnt lime (80 mm×down) flux to help form the slag. During blowing the metal in the vessel forms an emulsion with the slag, facilitating the refining process. Near the end of the blowing cycle, which takes about 20 minutes, the temperature is measured and samples are taken. The samples are tested and a computer analysis of the steel given within six minutes. A typical chemistry of the blown metal is 0.03-0.06% C, 0.05-0.1% Mn, 0.01-0.03% Si, 0.01-0.03% S and P.

The lime flux removes impurities and forms a slag that can be separated from the steel and poured from the furnace as a liquid. It also reduces refractory wear and gunning. Soft burnt flux lime is used, unless a finer product is required by specialty furnace injection applications. A BOF process commonly uses the soft burnt flux lime sized at 80 mm×down. The 80×down sized lime created several costly and time consuming problems at the facility. The excess fines drawn off by the dust collection system was material that was lost. The dust collection fines not only represented a significant loss of raw material, but also created a waste disposal stream having an unacceptably high pH, which required expensive treatment. In addition, the fines from the 80 mm×down sized material seriously overloaded the bag house and wet scrubbers. The facility was faced with serious environmental and maintenance problems along with the loss of lime during the lime charging process and all the associated costs incurred.

Typically, from 8-15%, or even occasionally as high as 20%, by weight of the soft-burnt (80 mm×down) flux lime fed to the basic oxygen furnace in the above mentioned commercial process was lost in the dust collection system prior to the present invention. The invention not only recovers this portion of the original 80 mm×down feed (or other defined lime fines) and obviates the costs associated with dogging and waste disposal, but also creates a high-value product from it.

SUMMARY OF THE INVENTION

This invention provides a unique and novel process to be integrated into the soft burnt lime feed stream (sometimes called herein "crushed flux lime" or "flux lime") in a BOF converter production process to eliminate the problem caused by the fines (typically 10 mm×down, sometimes herein called "lime fines") from the 80 mm×down (or larger) sized flux lime. This process consists in part of a screening operation prior to the feeding of the flux lime into the converter. In the example described below, the lime fines are screened from the feed stream of the 80 mm×down flux lime. This screened material, without the screened fines and further subject to dust collection, is fed into the converter. This material, a modified flux lime 80 mm×10 mm, having been stripped of lime fines (material smaller than 10 mm), significantly reduces material loss to waste, reduces the environmental problems associated with the over loading of fines in the dry and wet dust collectors, and reduces loss production time and the costs attributed to these factors in the BOF converter process.

The screened lime fines, the 10 mm×down, can then be diverted into a storage silo. From this storage silo, or directly from the screen, the lime fines are processed into a fine grain lime (0.1 mm×down) by the application of various feeding, screening, grinding equipment, and further into a high quality fluidized lime with the addition of fluidizers. A portion of the high quality fluidized lime fines produced by the invention may be used in a sintering plant and the balance of the high quality fluidized lime produced in the uniquely designed fluidized lime production plant can be sold to other customers. The invented system is one that is highly automated and capable of processing up to 60,000 tons annually of troublesome and costly lime fines into a high quality fluidized lime for sale and use in the hot metal desulfurization process as described above, for example by injection through a dip lance into a hot metal transfer ladle or other vessel preparing pig iron for pouring into the basic oxygen furnace. The design, engineering, know-how and innovative lime grinding technology enables this invention to produce a high quality fluidized lime from a portion of the 80 mm×down lime flux feed stream to the converter that ultimately, formerly, wound up as a costly waste material.

As is known in the art, dust collection systems are installed in lime systems for basic oxygen furnace (BOF) converters and desulfurization because the very small particles unavoidably present can escape into the atmosphere and environment of the steelmaking facility. The invention is not limited in terms of the precise cutoffs or fractions described above. For example, if an operator chooses to use a 90 mm×down sized flux lime instead of 80 mm×down, and/or screens the fraction 12 mm×down, the invention is equally applicable. The invention is applicable to any flux lime intended for use in a basic oxygen furnace (it may be called flux lime below) and can make a high quality fluidized lime from a fine grain fraction of the lime fines; the lime fines, while usually 10 mm×down, may be a somewhat wider range such as 12 mm×down or can have an even higher or lower limit. It should be understood that terms in this description such as "80 mm×down," "100 mm×down," and other ranges of size for lime particulates are meant as "nominal" size ranges, in that there may unavoidably be small portions by weight of particles outside the intended or target ranges. Where a term including zero is used, such as "0-100 mm," it is of course understood that the mixture of particles does not include any having a dimension of zero.

DETAILED DESCRIPTION OF THE INVENTION

Figure 1:
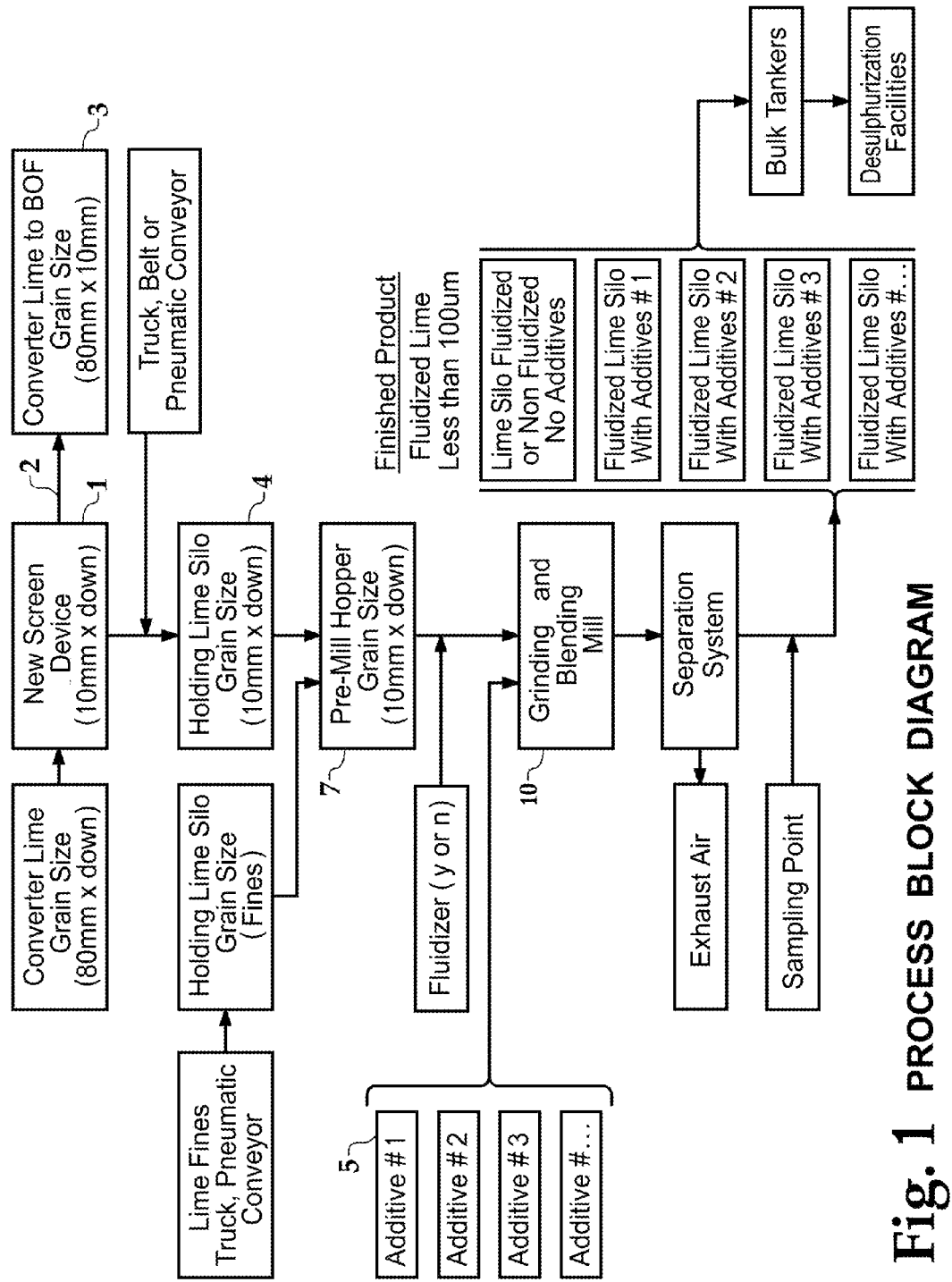
FIG. 1 is a block diagram of the improved process for preparing flux lime for use in a converter while also making separately useful products from the fines in the flux lime.

The manufacture of the high quality fluidized lime begins with the screening of the flux lime feed material. As indicated elsewhere herein, the invention is not limited to processing 80 mm×down lime (which is the basis for the example described), but includes the possible processing of 90 mm×down, 100 mm×down (sometimes herein 0-100 mm), and other suitable ranges of size of the converter flux lime feed material, which may include particles larger than 100 mm, i.e. any converter flux lime useful in the working converter. FIG. 1 shows the Process Block Diagram of an entire screening and grinding operation. A complete description of the lime grinding technology is discussed below in the section on FLUIDIZED LIME PRODUCTION FROM 10 MM×DOWN FINES. In the example of FIG. 1, a 10 mm sized screen 1 is inserted into the 80 mm×down flux lime feed stream to remove the 10 mm×down lime fines. This then produces an 80 mm×10 mm lime feed stream 2 going to the BOF converter 3. The elimination of these 10 mm×down fines from the BOF feed significantly reduces the majority of the problems mentioned elsewhere herein. The cost savings associated with the elimination of these problems are significant. Screen 1 is a vibratory screen inserted into a belt conveyor system moving the converter lime (80 mm×down flux lime) toward the BOF converter 3; the larger screened fraction (80 mm×10 mm) continues to the BOF while the screened 10 mm×down lime fines drop through the vibrating screen, and are transported by a belt conveyer, pneumatic conveyor, truck, or other means to a storage silo 4 or sent directly to a hopper 7 for feeding the grinding and blending mill 10.

At east equally significant is the inventor's ingenious design and construction of a lime grinding operation that took a 10 mm×down (fines) flux lime stream, the majority of which wound up in troublesome waste streams and material lost out the stack, and converted it into a usable high quality fluidized lime. This material also may be consumed elsewhere in the steelmaking facility and the remaining material sold to other customers requiring a high quality fluidized lime for hot metal desulfurization. Locating the fine grain pulverizing system in the steelmaking facility should be recognized as a highly beneficial part of the invention, as the hauling costs and difficulties of scheduling delivery comprise a large portion of the cost of desulfurizing agents. Moreover, the ability to manufacture fluidized fine grain lime to specification on site, along with the ability to include various additives in a range of concentrations, provides a versatility for steelmaking operations not available otherwise.

FIG. 1 shows where five or more different high quality fluidized lime products can be produced with the addition of various reagents 5, labeled Additive #1, Additive#2, Additive#3, and Additive# . . . upstream of the grinding and blending mill 10. The combined savings from the elimination of the problems associated with the fine material loss, significant reduction in environmental problems associated with the overloading of the dust collection systems and the utilization of the high quality fluidized lime in other operations are significant.

Fluidized Lime Production from 10 mm×Down Fines

The fluidized lime of the invention is a fine grain lime (fraction below 100 µm) treated with a special additive (fluidizing reagent) to increase pneumatic flowability. This increase in fluidization or flowability allows the lime to be transported easily through process pipelines in a desulfurization plant. It may therefore be referred to as a fluidized desulfurization agent.

Figure 2:
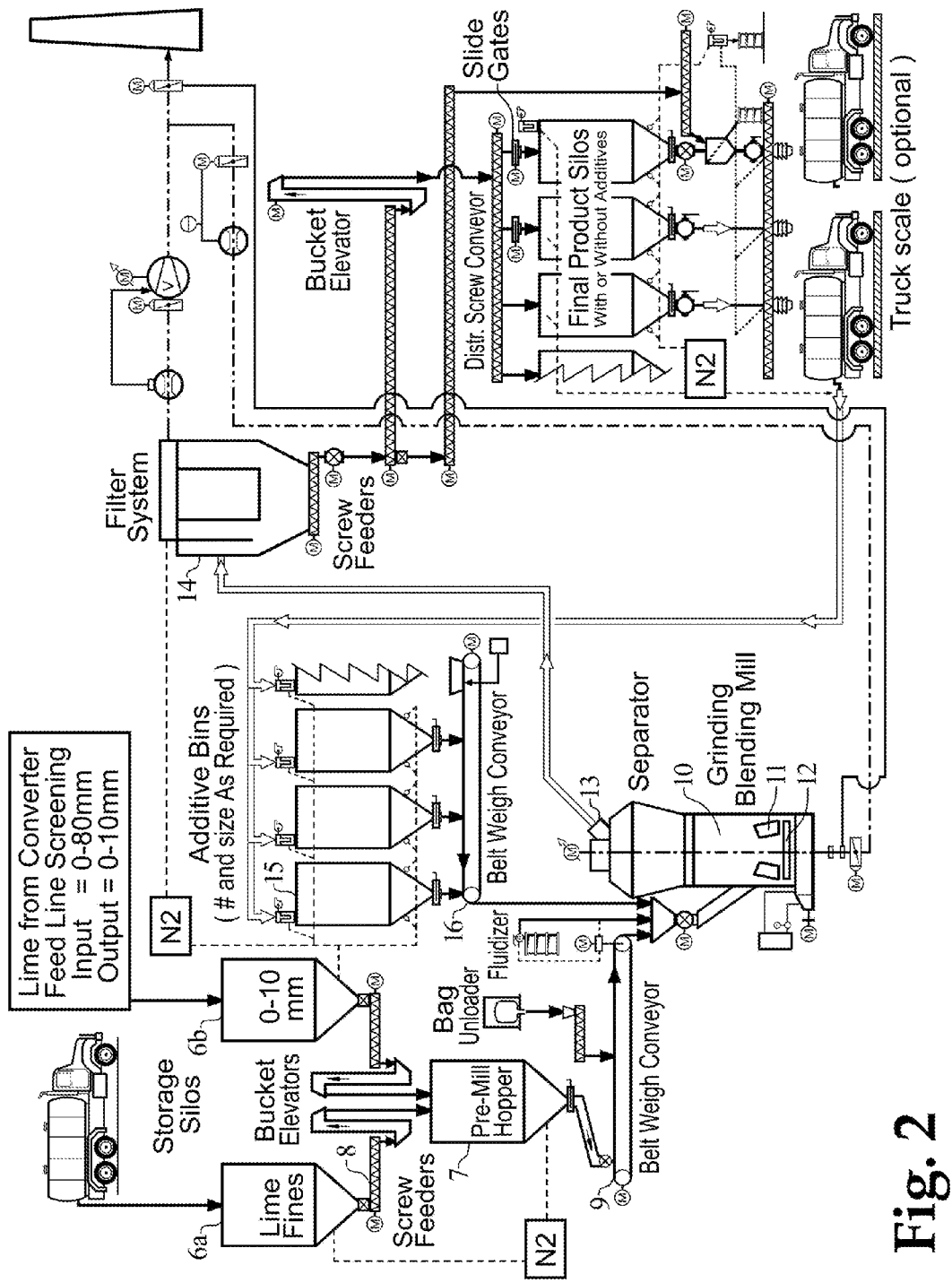
FIG. 2 is a more detailed flow diagram of the system for making fluidized lime from the fine grain lime fraction.

Referring now to FIG. 2, the 10 mm×down fines can be transported either by trucks or through a pneumatic piping system from the primary screening area 1 (FIG. 1) to a large storage silo 6a or 6b. The lime fines (10 mm×down fraction) are fed into a pre-mill hopper 7 by the use of a bucket elevator. From the storage silo 6b the lime fines may be transported into the daily pre-mill hopper 7 through a screw conveyer 8 with a magnetic separator device for removing metallic impurities from the lime stream. The outlet of the pre-hopper is equipped with a rotary valve, which controls the lime feed onto a weighting weighing conveyor 9. The controlled and weighed lime stream then falls into the mill chute with another rotary valve directly in the milling zone of the grinding and blending mill 10. The stationary grinding rollers 11 roll on a slowly rotating grinding table 12. The material is drawn in between the grinding roller and the grinding track and ground by pressure and shear. The compressive force required for the grinding or pulverizing of the material is generated by a hydro-pneumatic tensioning system. The hydro-pneumatic tensioning system is able to respond to the amount and size of the material on the table 12 and under the rollers 11.

The material is ground and conveyed by centrifugal force towards a stationary nozzle ring—that is, a ring of nozzles able to deliver gas into the lower portion of grinding and blending mill 10. Process (inert) gas nitrogen flows up through the nozzle ring, mixes with the ground material and carries it up to the classifier (separator 13) above the grinding and blending mill 10. In the separating zone a rotating separating wheel (a turning wheel cage with variable speed) separates the ground and dried material into a fine finished product (which may be <100 μm) and miscellaneous unwanted material. This unwanted material falls back into the center of the grinding zone or is fully or partially extracted, for example through a cone, as a coupled product or otherwise. The finished product, desirably 100 μm (0.1 mm) or smaller, leaves the classifier together with the process nitrogen or other gas stream and is separated from the gas in downstream cyclones or a filter unit such as filter system 14. When feeding the input lime into the grinding mill 10, fluidizing reagents or other additives may be dispensed from bins 15 by way of a belt weigh conveyor 16, for example. The fluidizer may function as grinding aid as well as a fluidizer for the lime. The fluidizer is necessary to eliminate surface tension between the particles and increase flow ability of the material. To assure flowability and make a useful fluidized, pulverized lime, 0.01 to 1% by weight of a fluidizing agent is added during the grinding (pulverizing) process so that the fluidizing agent is thoroughly mixed with the pulverized lime and coated on its surface. Preferably 0.05 to 0.5% by weight of a fluidizing agent, more preferably 0.075 to 0.125% by weight of a fluidizing agent, and, as a useful control setting, approximately 0.1% by weight of a fluidizing agent, is added as indicated at the end of belt weigh conveyor 9.

Any known or effective lime fluidizing agent may be used. Examples of effective fluidizing agents useful as additives during the pulverizing process according to the invention include polyols, silicone oils, organopolysiloxanes, and/or any desired mixtures thereof. Among the organopolysiloxanes may be mentioned polymethylsiloxanes, polymethylhydrogensiloxanes and any desired mixtures thereof. Suitable examples of polyols are glycols, and suitable examples of silicone oils include polydimethylsiloxanes and polymethylhydrogensiloxanes.

In accordance with the invention, the desulfurization agent (0-100 μm fluidized lime) contains between 0.01 and 1% by weight of one or more fluidizing agents, preferably between 0.05 and 0.5% by weight of one or more fluidizing agents, more preferably between 0.075 and 0.125% by weight of one or more fluidizing agents, and most preferably approximately 0.1% by weight of one or more flux agents.

The advantages of this kind of grinding mill are:
fewer requirements of ancillary machines
small space requirements
dust free operation
low noise level
low electric power consumption
optimal utilization of process heat (process air recycled)
system fully automatic Other materials in addition to fluidizing agents may be added to the lime during the pulverizing steps. For example, cryolite may be added to reduce iron loss and bitumen may be added to enhance desulfurization efficiency.

However, any grinding, milling, or pulverizing mechanism which achieves the final size of less than 0.1 mm while coating the product with 0.01% to 1% by weight of a fluidizing agent is useful in the invention. This means various ball mills, hammer mills, bowl mills, and any other effective pulverizing system can be used. It is believed, however, that the roller system described herein is uniquely practical for the present invention.

As indicated above, typically, from 8-15%, or even occasionally as high as 20%, by weight of the soft-burnt (80 mm×down) flux lime fed to the basic oxygen furnace in the above mentioned commercial process had been lost in the dust collection (wet scrubbing) system prior to the present invention. After use of the invention was begun, consistently less than 8% by weight of the modified flux lime fraction (the portion destined for the BOF after screening) was lost in the dust removal system. That is, at least 92% of the modified flux lime fraction was regularly utilized in the BOF, while the 10 mm and smaller portion was also very efficiently utilized to make fluidized lime. Optionally, by discretionary allocation of the fine grain lime fraction (usually 10 mm×down) between fluidized lime manufacture and use in the BOF converter, it proved possible, and practical, to utilize 97% or more of the modified flux lime fraction in the BOF converter, meaning that only a small amount, up to 3% by weight, of the modified flux lime fraction comprised dust captured in the dust collection system for the BOF converter feed. This was considered a highly successful environmental, as well as an economic, improvement resulting, for example, in a far more manageable waste water stream having a significantly lower pH. In addition, as indicated throughout this description, a very large portion of the otherwise troublesome fines have been made into products useful for desulfurization and other processes. Moreover, because the high quality fluidized lime was consistently and readily available on site in various specifications, the reliability of the system allowed the operators to completely eliminate the stand-by calcium carbide system which had always been held in readiness in case of clogging or other breakdowns of the lime feed or dust removal apparatus.

In case it is required to produce a fluidized lime product with other additives (soda, cryolite, spar or others) there is an extra hopper device for handling these materials in big bags or super sacks. This hopper is equipped with a weighting system and screw feeder that feeds the material directly into the grinding mill. Air flow coming through a louver ring around the grinding table takes the pulverized material and transports it towards the upper installed separator. The ground or pulverized lime is transported in a nitrogen atmosphere from the grinding mill to the bag house collector. The fan generating the required reduced pressure and flow is located behind the filter. The product is then transported out of the bag filter into the vane feeder through a screw conveyor rotary value. The product is transported into the finished product silo or loaded into over the road bulk tanker trucks.

A belt bucket elevator can be used in case the lime is to be transported from the filtering unit on the top of the silos. Screw feeders are used to transport the fluidized lime into the right product storage silo. Some customers require other additives in their fluidized lime product so that additional storage silos can be installed. The outlet of the final product storage silo is equipped with a screening device (2 mm) and a telescopic discharging device for bulk tanker truck loading.

Equipment Requirements for the Lime Grinding Operation

This section gives an overview and technical specifications for all the equipment and the operating parameters required to produce a highly fluidized lime in the grinding and blending mill operation shown in FIG. 1.

1. Screen Device:
Input: Lime grain size 0-10 mm
Output: lime 0-3 mm and 3-10 mm
Capacity: max. 10 ton/hr
Power: 4.0 KW/230 min-1
Weight: 2.000 kg
Dimension—2000×2000 mm
2. Silo 10 mm×Down
Capacity: 80 ton
Equipped with:
Filter max. 15 mg/Nm$^3$
Over-/under pressure valve
Inspection door
Level indicators
Aeration system
Loading device for railway cars
3. Screw Feeder
Diameter: 250 mm
Capacity: 10 tons/hr
Power: 3.5 KW
Operation controlled
4. Bucket Elevator
Capacity: 10 tons/hr
Power: 3.5 kW
Operation controlled
5. Pre Mill Hopper
Capacity: 7 m$^3$ with emergency gate
Equipped with:
Filter max. 15 mg/Nm$^3$
Over-/under pressure valve
Inspection door
Level indicators
Aeration system
6. Slide Gate with Rotary Valve.
Diameter 250 mm
Capacity: 5 tons/hr
Power: 2.2 KW frequency transformer controlled
Connected with the mill regulation control system
7. Belt Weighting Conveyor
Range of adjustment rate: 1-10
Capacity: 1-7 tons/hr
Power: 0.55 kW
CPU controlled
8. Fluidizer Dosage Unit
Magnetic-membrane dosage pump
Free adjustable
CPU controlled
Fluidizer flow rate is from 0.8 up to 1.2 kg per ton of lime. A special fluidizer supply unit operating in auto mode is used.
9. Additive—Feeding Station
Designed for bulk bags and container
Scale and screw feeder
Lost weight system
Dosage rate from 2-10 weight % of milling product (5 tons/hr)
10. Grinding Mill
With chute and rotary valve
The mill includes the following parts:
 1. Lower section of the mill
 2. Upper section of the mill
 3. Grinding bowl
 4. rollers
 5. Set of grinding elements:
  5.1 multi section grinding table
  5.2 rollers made of wear resistant materials.
 6. Two combination levers
 7. Hydro-pneumatic system
 8. Hydraulic unit for Gear box.
 9. Standard industrial type motor, IP 55.
 10. Compensator at the mill outlet
 11. Separator
High performance separator with centrifugal screening performed through static louver ring and dynamic rotor.
 12. Filter System for Separation of Process Air
12.000 Nm$^3$/hr under normal condition
equipped with:
Textile filter elements (life time 1.500 working hours)
Automatic filter element cleaning device
With required piping and control flaps and chimney and Fan (35 kW)
Collecting screw feeder and rotary valve
Product—fluidized lime less that 100 μm
Cleaning type—Jet Pulse
Working chamber temperature—minimum −10° C. maximum 80° C.
Nitrogen pressure—6 Bar
Cleaning capacity—<15 mg/nm$^3$
Filter cleans automatically with pulse pressure
 13. Bucket Elevator
Capacity 8 tons/hr
Power 3.5 kW
Operation controlled automatic sampling device
 14. Distribution Screw Conveyor with Slide Gates
Capacity: 8 tons/hr
Power: 3.5 kW
Operation controlled
 15. Final Product Silo #1
Capacity: 80 tons
Equipped with:
Filter max. 15 mg/Nm$^3$
Over-/under pressure valve
Inspection door
Level indicators
Aeration system
Screening device 2 mm
Loading device for silo truck
Loading device for silo truck (option, also loading device from silo 80 tons)
 16. Bulk Bag Loading Station Equipped with
Screw feeder
Bulk bag loading frame with scale
Filter system
 17. Truck Scale
As required
 18. Process Automation System with Visualization
Gas measurement after filter
Pressure measurement before the mill
Pressure drop inside the mill
Pressure drop inside the filter
Temperature measurement after the mill
Transmitters are installed locally in mounting panel along with shut off valves etc. and are ready for installation onto pipelines.
Fully automated PLC controlled work station interface
 19. Laboratory Equipment
Flow channel with compressor and vacuum cleaner
Camsizer XT (grain size distribution)
CO2/Water determinator (ELTRA)
Spectro iQ II with calibration
 (MgO analyzer)
Nitrogen generator:
 Capacity: min. 25 Nm$^3$/hour, max. 6 bar My invention includes a method of making fluidized lime comprising (a) passing a stream of crushed flux lime through a screen to obtain (i) a fine grain fraction within the range 0-12 mm and (ii) a modified flux lime fraction greater than 10 mm, (b) adding a fluidizer to said fine grain fraction, and (c) pulverizing said fine grain fraction in the presence of said fluidizer to obtain a fluidized lime.

In another aspect, my invention includes a method of preparing and using lime in a steelmaking facility comprising (a) passing flux lime through a screen to obtain a modified flux lime fraction and a fine grain lime fraction, (b) removing less than 8% by weight of said modified flux lime fraction in the form of dust and thereafter passing said modified flux lime fraction into a basic oxygen furnace, and (c) pulverizing said fine grain lime fraction in the presence of 0.01% to 1.0% by weight of a fluidizing agent, to obtain a fluidized fine grain lime fraction having a nominal size range of 0.1 mm or smaller.

The invention also includes a method of preparing and using lime in a steelmaking facility comprising (a) passing flux lime through at least one vibratory screen in said steelmaking facility to obtain (i) a modified flux lime fraction having a nominal size range of 10-80 mm and containing a small amount of dust and (ii) a fine grain lime fraction having a nominal size range of 0-10 mm, (b) removing dust from said modified flux lime fraction and thereafter passing at least 92% by weight of said modified flux lime fraction into a basic oxygen furnace in said steelmaking facility, (c) adding a fluidizer to said fine grain lime fraction, (d) pulverizing said fine grain lime fraction in said steelmaking facility in the presence of said fluidizer, to obtain a pulverized and fluidized fine grain lime fraction having a nominal size range of 0.1 mm or smaller, and (e) using said pulverized and fluidized fine grain lime fraction for hot metal desulfurization in said steelmaking facility.

While I have described a present preferred embodiment of the invention, it is to be distinctly understood that the invention is not limited thereto but may be otherwise embodied and practiced within the scope of the following claims.

I claim:

1. Method of making fluidized lime comprising (a) passing a stream of crushed flux lime through a screen to obtain (i) a fine grain fraction within the range 0-12 mm and (ii) a modified flux lime fraction greater than 10 mm, (b) adding a fluidizer to said fine grain fraction, and (c) pulverizing said fine grain fraction in the presence of said fluidizer to obtain a fluidized lime.

2. Method of claim 1 wherein said pulverizing of said fine grain fraction in step (c) is performed by stationary grinding wheels on a revolving table.

3. Method of claim 2 including applying tension on said stationary grinding wheels to control the pulverizing process of step (c).

4. Method of claim 2 including recovering said fine grain fraction from said stationary grinding wheels by a gas stream.

5. Method of claim 1 wherein said crushed flux lime is within the range 0-80 mm, said fine grain fraction (i) is within the range 0-10 mm, said modified flux lime fraction (ii) is within the range 10-80 mm, and said fluidized lime obtained is 0-0.1 mm.

6. Method of preparing and using lime in a steelmaking facility comprising (a) passing flux lime through a screen to obtain a modified flux lime fraction and a fine grain lime fraction, (b) removing less than 8% by weight of said modified flux lime fraction in the form of dust and thereafter passing said modified flux lime fraction into a basic oxygen furnace, and (c) pulverizing said fine grain lime fraction in the presence of 0.01% to 1.0% by weight of a fluidizing agent, to obtain a fluidized fine grain lime fraction having a nominal size range of 0.1 mm or smaller.

7. Method of claim 6 wherein said dust is removed in a wet scrubber.

8. Method of claim 6 wherein said modified flux lime fraction has a nominal size range of 10-80 mm.

9. Method of claim 6 wherein said fine grain lime fraction obtained in step (a) has a nominal size range of 0-10 mm.

10. Method of claim 6 wherein said screen in step (a) comprises at least one vibratory screen.

11. Method of claim 6 wherein said screen in step (a) comprises three vibratory screens.

12. Method of claim 6 including, in step (c), suspending said fine grain lime fraction 0.1 mm or smaller in an inert gas.

13. Method of claim 6 including feeding said fine grain lime fraction obtained in step (c) to a hot metal desulfurization process.

14. Method of claim 6 including, in step (a), conveying said flux lime on a conveyor belt to at least one vibrating screen, and further conveying said modified flux fraction on a conveyor belt for grinding in step (b).

15. Method of claim 6 wherein said pulverizing in step (c) includes applying tension to stationary grinding wheels on a rotating grinding table.

16. Method of claim 15 including conveying said pulverized fine grain lime fraction upwardly by nitrogen from said revolving table to a centrifugal screening separator.

17. Method of claim 16 wherein said centrifugal screening separator includes a static louver ring and a dynamic rotor.

18. Method of preparing and using lime in a steelmaking facility comprising (a) passing flux lime through at least one vibratory screen in said steelmaking facility to obtain (i) a modified flux lime fraction having a nominal size range of 10-80 mm and containing a small amount of dust and (ii) a fine grain lime fraction having a nominal size range of 0-10 mm, (b) removing dust from said modified flux lime fraction and thereafter passing at least 92% by weight of said modified flux lime fraction into a basic oxygen furnace in said steelmaking facility, (c) adding a fluidizer to said fine grain lime fraction, (d) pulverizing said fine grain lime fraction in said steelmaking facility in the presence of said fluidizer, to obtain a pulverized and fluidized fine grain lime fraction having a nominal size range of 0.1 mm or smaller, and (e) using said pulverized and fluidized fine grain lime fraction for hot metal desulfurization in said steelmaking facility.

19. Method of claim 18 including, in step (a), passing said flux lime through three vibratory screens.

20. Method of claim 18 wherein said pulverizing in step (d) is performed using stationary grinding wheels on a rotating grinding table.

* * * * *